July 10, 1934.  F. DONOHUE, JR  1,966,382
PROPELLER MECHANISM FOR AIRCRAFT
Filed May 8, 1933  2 Sheets-Sheet 1
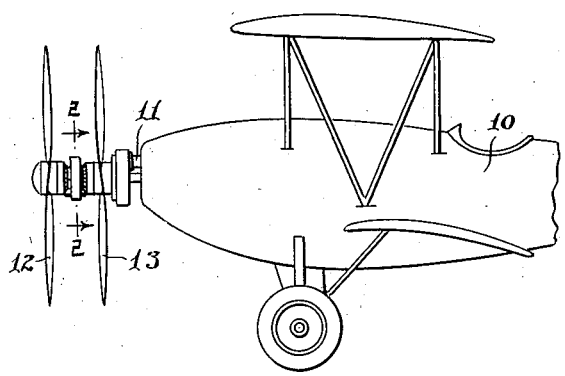
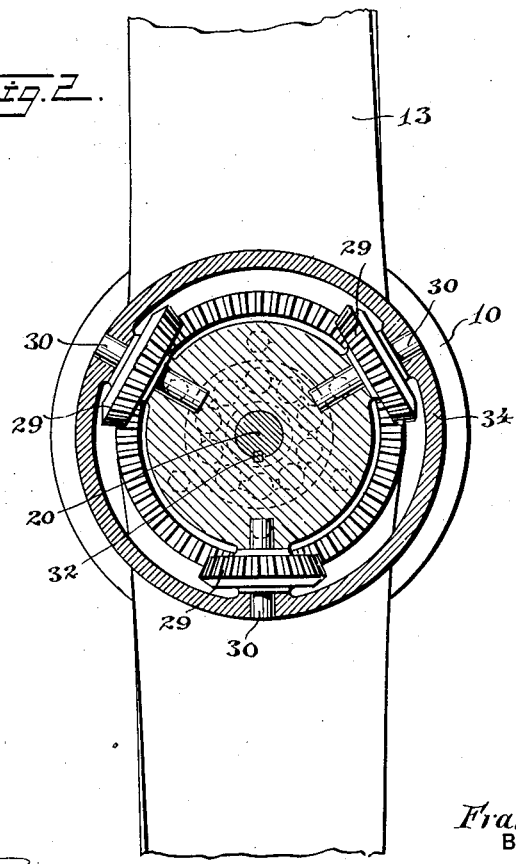
WITNESSES
INVENTOR
Frank Donohue Jr.
BY
ATTORNEYS July 10, 1934.  F. DONOHUE, JR  1,966,382
PROPELLER MECHANISM FOR AIRCRAFT
Filed May 8, 1933  2 Sheets-Sheet 2
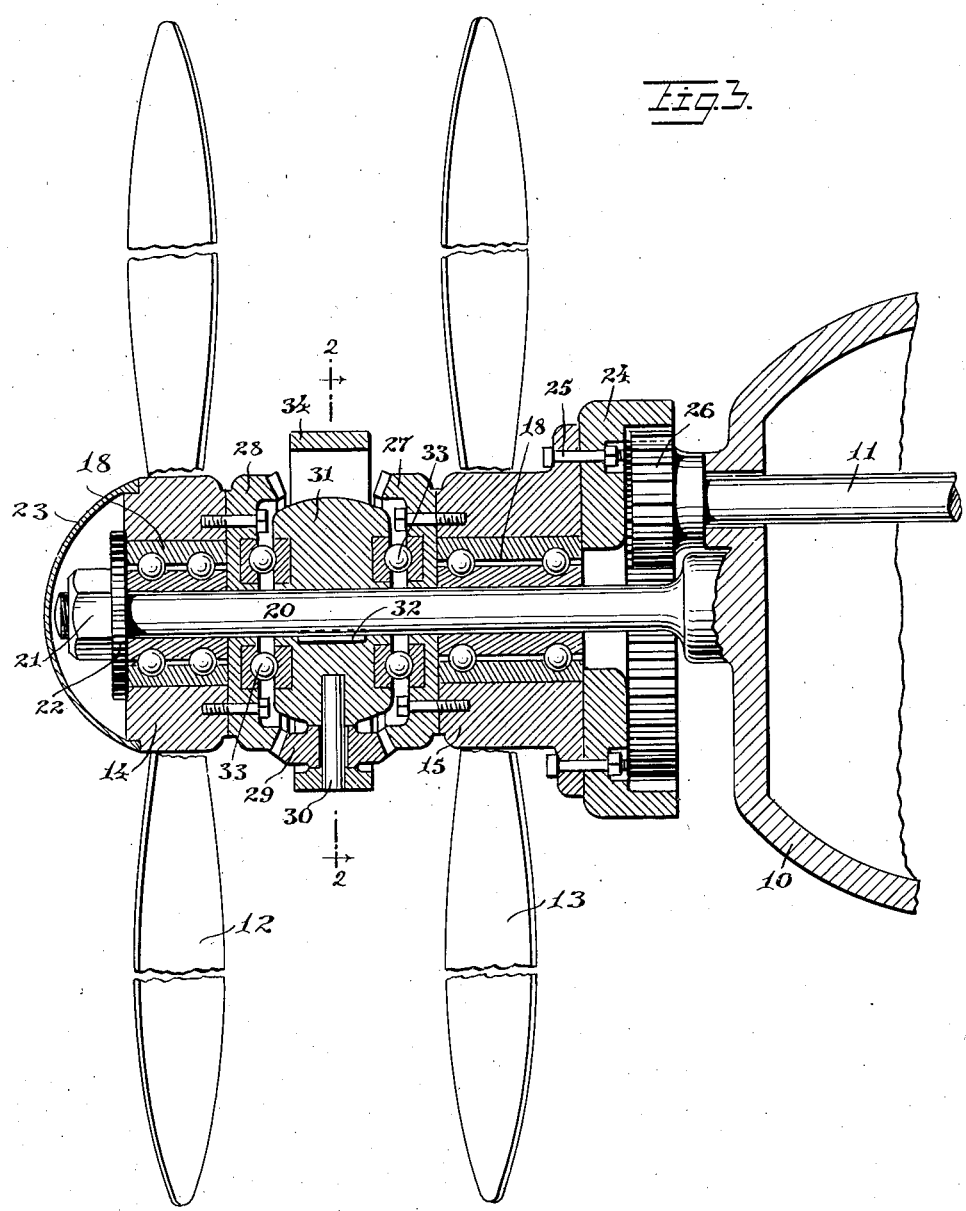
INVENTOR
Frank Donohue Jr.

Patented July 10, 1934

1,966,382

UNITED STATES PATENT OFFICE 1,966,382

PROPELLER MECHANISM FOR AIRCRAFT

Frank Donohue, Jr., Brooklyn, N. Y.

Application May 8, 1933, Serial No. 669,978

7 Claims. (Cl. 170—165)

This invention relates to propeller mechanism for aircraft.

It is among the objects of the present invention to provide an improved propeller transmission mechanism which overcomes the natural difficulties found in the direct connection of a propeller with the drive shaft of the power plant.

A further object of the present invention is to provide propeller transmission mechanism for aircraft which will rotate the propeller at a speed less than that of the drive shaft of the power plant.

A further object of the present invention is to provide propeller transmission mechanism for aircraft by which a pair of oppositely pitched propellers may be rotated in opposite directions by a single power plant.

A further object of the present invention is to provide a propeller transmission mechanism for aircraft adapted to rotate a pair of oppositely pitched propellers in opposite directions at a fixed speed ratio.

A further object of the present invention is to provide an improved propeller transmission mechanism including a pair of oppositely pitched propellers arranged in geared relation whereby opposite rotation thereof will be at a predetermined ratio which will not vary in response to variations in the resistance to the turning movement of the propellers.

A further object of the invention is to provide twin propellers and suitable mechanism for driving them to rotate in opposite directions, and in which an aerodynamic effect will be attained to equalize the thrust according to any specific speed, by reason of a variation in the pitch and/or size of the blades of one propeller with respect to the blades of the other propeller.

Other objects of the present invention include the combination and interrelation of parts whereby the whole forms a novel, simple and improved structure well designed to meet the demands of economic manufacture.

Further objects and features of the present invention will be apparent from a consideration of the following specification taken in conjunction with the accompanying drawings, in which Figure 1 is a fragmentary perspective view of an aircraft embodying one form of the present invention;

Fig. 2 is a vertical section taken on lines 2—2 of Figs. 1 and 3;

Fig. 3 is a detail enlarged longitudinal section through the propelling mechanism of the present invention.

Referring more particularly to the drawings, it will be seen from Fig. 1, that the device is applicable to airplanes or similar aircraft, the invention being illustrated in connection with the airplane indicated by the numeral 10 in said figure.

The airplane or similar craft is provided with the conventional power plant (not shown) and preferably is of the high speed internal combustion engine type including a single drive shaft, as indicated at 11. The drive shaft 11 of the power plant is adapted to rotate in opposite directions, two or more oppositely pitched propellers as indicated by the numerals 12 and 13. It will be seen that the propellers are axially alined for rotation about a common axis and that the pitch of one is opposite to the pitch of the next adjacent propeller so that in combination with the natural translatory moments of the propellers, there is a reactance therebetween whereby the summation of such translatory moments is greater than the summation of such natural moments.

In connection with the present invention, it will be understood that the device is not limited to the single pair of propellers here shown, but that three or any number of propellers may be used, it being understood that adjacent propellers are oppositely pitched. It will further be seen from the following description that the invention is not limited to two or more propellers, it being an important object of the invention to reduce the speed of rotation of the propeller as compared with the speed of rotation of the driving shaft 11; thus with the present invention only a single propeller may be used but its speed will be so reduced that the desired high speed internal combustion engine may be used efficiently therewith. It has been found in aerodynamic research that propeller speeds are most efficient when in a range below that normally imparted thereto by so-called high speed internal combustion engines. In order to produce slower speed engines of the desired horse power, it is necessary to increase the size of the bore and the length of the stroke which obviously necessitates increased structure size, thus increasing the weight per horse power. It is thus desirable to utilize the light-weight, high-speed, short-stroke, internal combustion engine motors in aircraft and the present invention provides means for using such motors without loss of efficiency due to an abnormal propeller speed.

Referring more particularly to that form of the invention shown in Fig. 3, it will be seen that the propellers 12 and 13 include hubs 14 and 15, respectively. The propeller blades are formed with the hub in any desired manner. Each of the hubs 14 and 15 is shown as including ball-bearing mounting assemblies 18, which may be of any desired form, the invention not being confined to any specific roller mounting for the hubs.

From the foregoing it will be seen that the hubs 14 and 15 are freely rotatable over a fixed supporting shaft 20, which extends forwardly from the forward portion of the body 10 of the aircraft. The hubs and associated mechanism are secured on the shaft 20 by the provision of a securing nut 21 and associated washer 22, which bear against the forward hub 14, a suitable cover 23 being provided for the nut assembly.

For rotating the propellers, the hub 15 of the rear propeller 13 is provided with an internally toothed housing 24, which is secured to the hub by the provision of suitable securing bolts 25. The teeth of the housing are arranged for engagement with the teeth of a main driving gear 26 which is carried on the forward protruding extremity of the drive shaft 11. From this construction it will be seen that upon rotation of the drive shaft 11, the rear hub 15 and its associated propeller blades are rotated at a reduced speed from that of the rotation of the drive shaft 11 and that the direction of rotation is in conformity with the direction of rotation of the drive shaft.

For rotating the forward blade in a direction opposite to the rotation of the rear blades and at a fixed speed ratio, an intermediate transmission mechanism is provided which includes a bevel driving gear 27 carried by the rear hub 15 and a similar bevel gear 28 carried by the forward hub 14, the teeth of the gear 28 being directed rearwardly while the teeth of the gear 27 are directed forwardly and are associated for driving relation by a group of intermediate bevel gears 29 which are carried upon pinions 30 mounted upon a stationary hub 31 which is carried by the shaft 20 and locked thereto by a key 32. The structure further includes bearings as indicated at 33, between the hubs 14 and 15 and the hub 31, together with an external securing ring 34 for the outer ends of the pinions 30.

In the operation of the device it will readily be seen that rotation of the rear hub 15 in response to rotation of the shaft 11, will effect rotation of the intermediate gears 29 which are prevented from planetation and rotated upon their pinions to effect the opposite rotation of the forward hub 14 by engagement of its associated gear 28.

From the foregoing it will be seen that the present invention provides for the rotation in opposite directions of a plurality of propellers and further provides for the interconnection thereof to maintain a fixed ratio of speeds therebetween. It will be understood that the present invention is not confined to the specific structure herein presented, but that numerous changes, modifications, and the full use of equivalents may be resorted to without departing from the spirit or scope of the invention as outlined in the appended claims.

What is claimed is:

1. In a device of the character described, a fixed shaft, a plurality of oppositely pitched propellers rotatably supported on said shaft, means for driving one of said propellers, and intermediate means between said propellers for oppositely rotating the other propeller at a fixed ratio of speed with respect to the rotation of said first mentioned propeller.

2. In a device of the character described, a fixed shaft, a plurality of oppositely pitched propellers rotatably supported on said shaft, means for driving one of said propellers, and intermediate means between said propellers for oppositely rotating the other propeller at a fixed ratio of speed with respect to the rotation of said first mentioned propeller, said last-mentioned means including a plurality of bevel gears mounted between said propellers for driving therebetween.

3. In a device of the character described, a fixed shaft, a plurality of oppositely pitched propellers rotatably supported on said shaft, means for driving one of said propellers, and intermediate means between said propellers for oppositely rotating the other propeller at a fixed ratio of speed with respect to the rotation of said mentioned propeller, said last-mentioned means including a plurality of bevel gears mounted between said propellers for driving therebetween, said gear being mounted upon a fixed hub carried by said shaft.

4. In a device of the character described, a fixed shaft, a plurality of oppositely pitched propellers rotatably supported on said shaft, means for driving one of said propellers, intermediate means between said propellers for oppositely rotating the other propeller at a fixed ratio of speed with respect to the rotation of said first mentioned propeller, said intermediate means including a plurality of bevel gears mounted between said propellers for driving therebetween, said gears being mounted upon a fixed hub carried by said shaft, a drive shaft of a power plant, and driving connection between one of said propellers and the drive shaft.

5. In a device of the character described, a fixed shaft, a plurality of oppositely pitched propellers rotatably supported on said shaft, means for driving one of said propellers, intermediate means between said propellers for oppositely rotating the other propeller at a fixed ratio of speed with respect to the rotation of said first mentioned propeller, said intermediate means including a plurality of bevel gears mounted between said propellers for driving therebetween, said gears being mounted upon a fixed hub carried by said shaft, a drive shaft of a power plant, and driving connection between one of said propellers and the drive shaft, said connection including an internally toothed housing carried by said propeller and a gear carried by said drive shaft for enmeshment with the teeth of said housing.

6. The combination with a drive shaft of a power plant, of a fixed shaft, a plurality of oppositely pitched propellers rotatably mounted on said fixed shaft, intermediate means employed to oppositely rotate said propellers at a definite ratio of speed with respect to each other, and transmission means between the drive shaft and one of said propellers.

7. The combination with driving means, of a fixed shaft, and an assembly mounted for operation on said fixed shaft, said assembly including a plurality of oppositely pitched propellers which rotate on said shaft in opposite directions in response to the operation of said assembly, said assembly being operated by said driving means.

FRANK DONOHUE, Jr.